United States Patent [19]

Laskoskie et al.

[11] Patent Number: 5,351,124
[45] Date of Patent: Sep. 27, 1994

[54] BIREFRINGENT COMPONENT AXIS ALIGNMENT DETECTOR

[75] Inventors: Clarence E. Laskoskie, Scottsdale; Bogdan Szafraniec, Cave Creek, both of Ariz.

[73] Assignee: Honeywell Inc., Minneapolis, Minn.

[21] Appl. No.: 998,312

[22] Filed: Dec. 29, 1992

[51] Int. Cl.$^5$ ............................................. G01B 9/02
[52] U.S. Cl. .................................. 356/351; 356/345; 385/11
[58] Field of Search .................... 356/345, 351; 385/11

[56] References Cited

U.S. PATENT DOCUMENTS 4,893,931  1/1990  Lefevre et al. ...................... 356/351
5,255,068  10/1993  Emo et al. ........................... 356/345

OTHER PUBLICATIONS

J. Blake, "Magnetic Field Sensitivity of Depolarized Fiber Optic Gyros", 1990, *SPIE Fiber Optic and Laser Sensors VIII*, vol. 1367, pp. 81–85.
R. Ulrich, "Polarization and Depolarization in the Fiber-Optic Gyroscope", 1991, *Fiber–Optic Rotation Sensors and Related Technologies*, pp. 239–263.
S. Schroter, et al., "Comparison between open–loop and closed–loop fiber–optic gyroscopes with polarizing and depolarized components", 1991, *SPIE Fiber Optic Gyros: 15th Anniversary Conference*, vol. 1585, pp. 335–345.
Hidehiko Negishi, et al., "AM Noise Reduction in Fiber Optic Rotation Sensors", 1991, SPIE, *Fiber Optic Gyros: 15th Anniversary Conference*, vol. 1585, pp. 276–287.
Harry L. Gubbins, "A Prototype Strapdown IRU with Passive Fiber Optic Gyros", 1987, IEEE, pp. 376–382.
Michael Bramson, "The depolarized fiber–optic gyro for future applications", *SPIE, Fiber Optic and Laser Sensors*, 1990, vol. 1367, pp. 155–159.
B. Kelley, et al., "Novel Fiber–Optic Gyroscopes for KEW Applications", Feb. 1992, *American Institute of Aeronautics and Astronautics: 1992 Aerospace Design Conference*.
R. J. Fredricks and R. Ulrich, "Phase Error Bounds of Fibre Gyro with Imperfect Polariser/Depolariser", 1984, *Electronics Letters*, vol. 20(8), pp. 330–332.
J. Blake, et al., "Progress in low cost interferometric fiber optic gyros", 1992, SPIE, vol. 1694, pp. 188–192.
K. Bohm, et al., "Low–Drift Fibre Gyro Using a Superluminescent Diode", 1981, *Electronics Letters*, vol. 17(10), pp. 352–353.
Shinji Motohara and Arikata Ohno, "Fiber Optic Gyroscope with Single Mode Fiber Coil", pp. 30–33.

Primary Examiner—Samuel A. Turner
Assistant Examiner—Peter J. Rashid
Attorney, Agent, or Firm—John G. Shudy, Jr.

[57] ABSTRACT

An axis alignment detector for aligning axes of two birefringent components or fibers at forty-five degrees relative to each other. Polarized light is put into one axis of one of the two components or fibers to be aligned. The light goes from the one fiber through a junction where the two components or fibers are to be aligned at forty-five degrees, into the axes of the other component or fiber. The other component or fiber is temporarily connected to a third birefringent component or fiber wherein light moves on into the third component or fiber. The light from the third component or fiber goes on through a polarizer on to a mirror or integrated optic interferometer. The interferometer provides an interference output that reveals when the two components or fibers have a forty-five degree axis alignment. Also, the interferometer output may be used to measure other angles of axis alignment. One light path of the interferometer is modulated and the interferometer output is converted to an electrical signal which is electronically processed to improve detection of an accurate forty-five degree alignment of the to-be-joined or spliced pair of birefringent components or fibers.

11 Claims, 6 Drawing Sheets

BIREFRINGENT COMPONENT AXIS ALIGNMENT DETECTOR

The United States Government may have rights to the present invention under contract number DASG60-91-C-0141.

BACKGROUND OF THE INVENTION

The present invention relates to the aligning of optical birefringent components. The invention particularly relates to the splicing of birefringent optical fibers, and more particularly to splicing that requires a particular alignment of the axes of the fibers.

The common technique of aligning the axes of polarization maintaining fibers at forty-five degrees in the related art involves a measurement of the polarization extinction ratio at the output of one of the fibers. If polarized light is input to a first fiber on an axis and this fiber is aligned with a second fiber at forty-five degrees with respect to their axes, light of equal power is launched into and exited from both axes of the second fiber. The power at the output of the second fiber is measured by having the exiting light go into an analyzer. Forty-five degree alignment is accomplished when the measured power is independent of the analyzer's angular position with respect to the second fiber. The accuracy of this popular method is limited by the available power from the light and may depend very much on the light source characteristics. This method is also prone to measurement errors because the analyzer must be iteratively rotated. Further, the method is very time consuming.

SUMMARY OF THE INVENTION

The present invention involves putting two birefringent fibers or components end to end so that the axes may be aligned at an angle of forty-five degrees. Polarized light is input primarily into one axis of the first fiber or component. The light goes from the first fiber or component into a second fiber or component whose axes are to be aligned at some angle with respect to those of the first fiber or component. Light from both axes of the second fiber or component goes into a third birefringent fiber or component which has axes aligned at about forty-five degrees to the second fiber or component and thus light propagates down the both axes of the third fiber or component to a polarizer whose axis is aligned at about forty-five degrees to an axis of the third fiber or component. The alignments of the polarized light to the first fiber or component, of the second fiber or component to the third fiber or component, and of the third fiber or component to the polarizer, are not critical to the alignment determination of the axes of the first and second fibers or components, except only in the sense of magnitude of and noise on the alignment indicating signal of the invention. Some light which goes from both axes of the third fiber or component through the polarizer, goes on into an interferometer. The interferometer has two optical paths which are unequal in length by a certain amount to compensate for the phase delay between respective light signals caused by the difference of the fast and slow axes of the third fiber or component. The interference term at the output of the interferometer is at a minimum which indicates that the magnitudes or powers of the two light signals going through the two axes of the second fiber or component are equal thereby indicating a forty-five degree alignment between the axes of the first fiber or component and the second fiber or component. The resolution of alignment is improved by the modulation of the length of one optical path of the interferometer, which improves the resolution of the interferometer output by removing the bias on the interferometer output, which represents background light and certain noise. The output as it is converted to an electrical signal has the D.C. component removed and the nulling signal has only the A.C. signal for improved resolution in the alignment determination. The modulated path length is caused by a periodic signal, typically a sine wave, from a signal generator connected to a modulator on the optical path. A lock-in amplifier is connected to the signal generator for purposes of singling out a particular component of the electrical signal at a specific reference frequency and phase. The electrical signal is from a photodiode that is sensing the optical output of the interferometer. The photodiode output is mixed in two multipliers, each having as reference inputs sine waves which are at a relative ninety-degree phase difference, respectively, and have a frequency the same as that of the signal generator. The outputs of the multipliers are filtered, combined and then inputted into a volt meter or other appropriate indicator. The meter or indicator provides the person, who is aligning the axes of the first and second fibers or components, a nulling indication when the axes alignment approaches forty-five degrees. Additionally, the indicator, not only notes nulling for a forty-five degree alignment, it can indicate other alignments between axes of the birefringent fibers or components in accordance with the output of the lock-in amplifier.

The present invention achieves a very accurate forty-five degree angle between the respective axes of the two birefringent fibers being spliced or components being joined. Such fiber alignment is critical for optimal performance of depolarized fiber optic gyroscopes and other systems requiring the minimization of polarization signal fading.

A forty-five degree alignment of birefringent fiber axes is achieved by the present invention with a small device using low voltage. Resolution of alignment is not limited by source bandwidth; and for this, broadband sources may be indiscriminately used. In fact, broadband sources are preferred. Further, fixed components are used so that axis alignment and alignment acquisition times are minimal.

DESCRIPTION OF THE PREFERRED EMBODIMENT

Figure 1A:
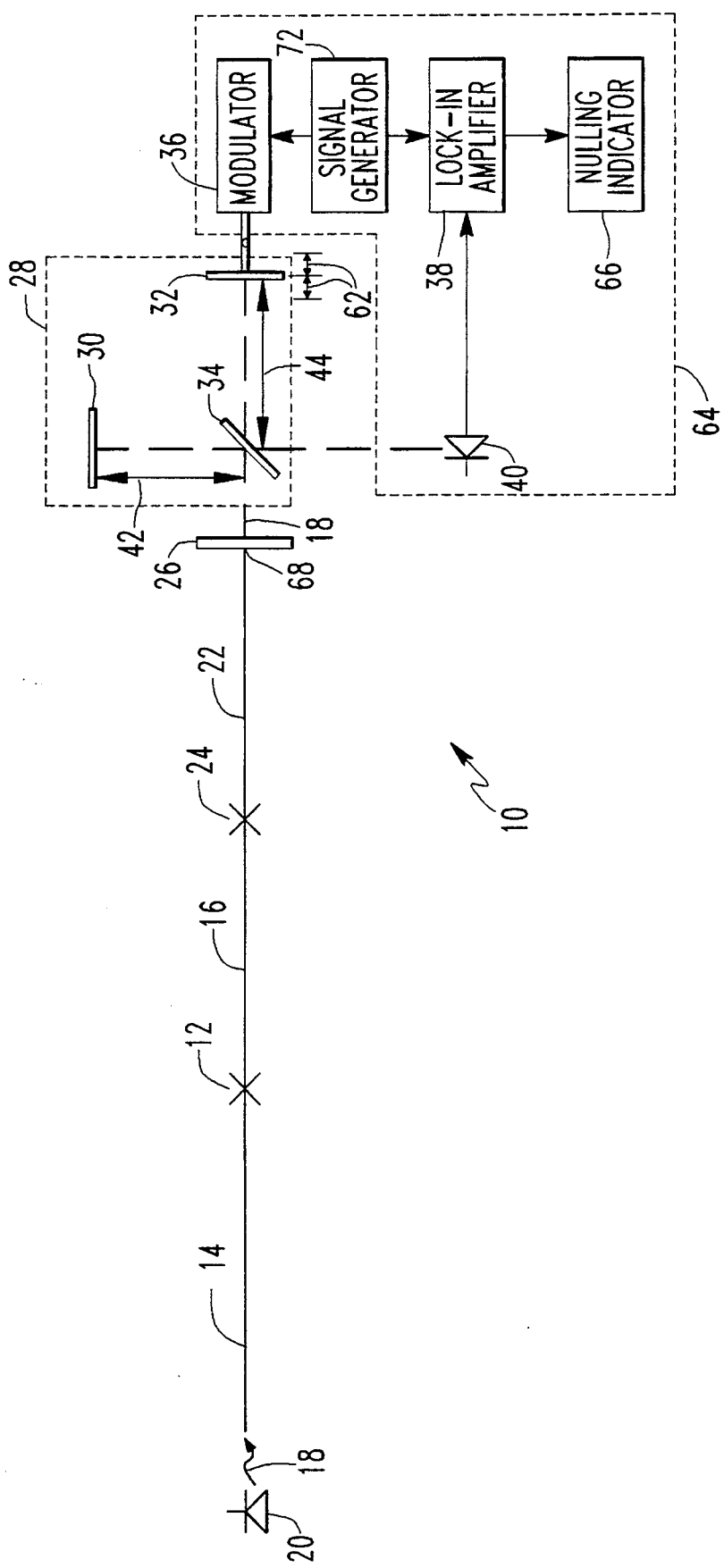
FIGS. 1a and 1b show the arrangement of the fibers and equipment for alignment determination.
Figure 1B:
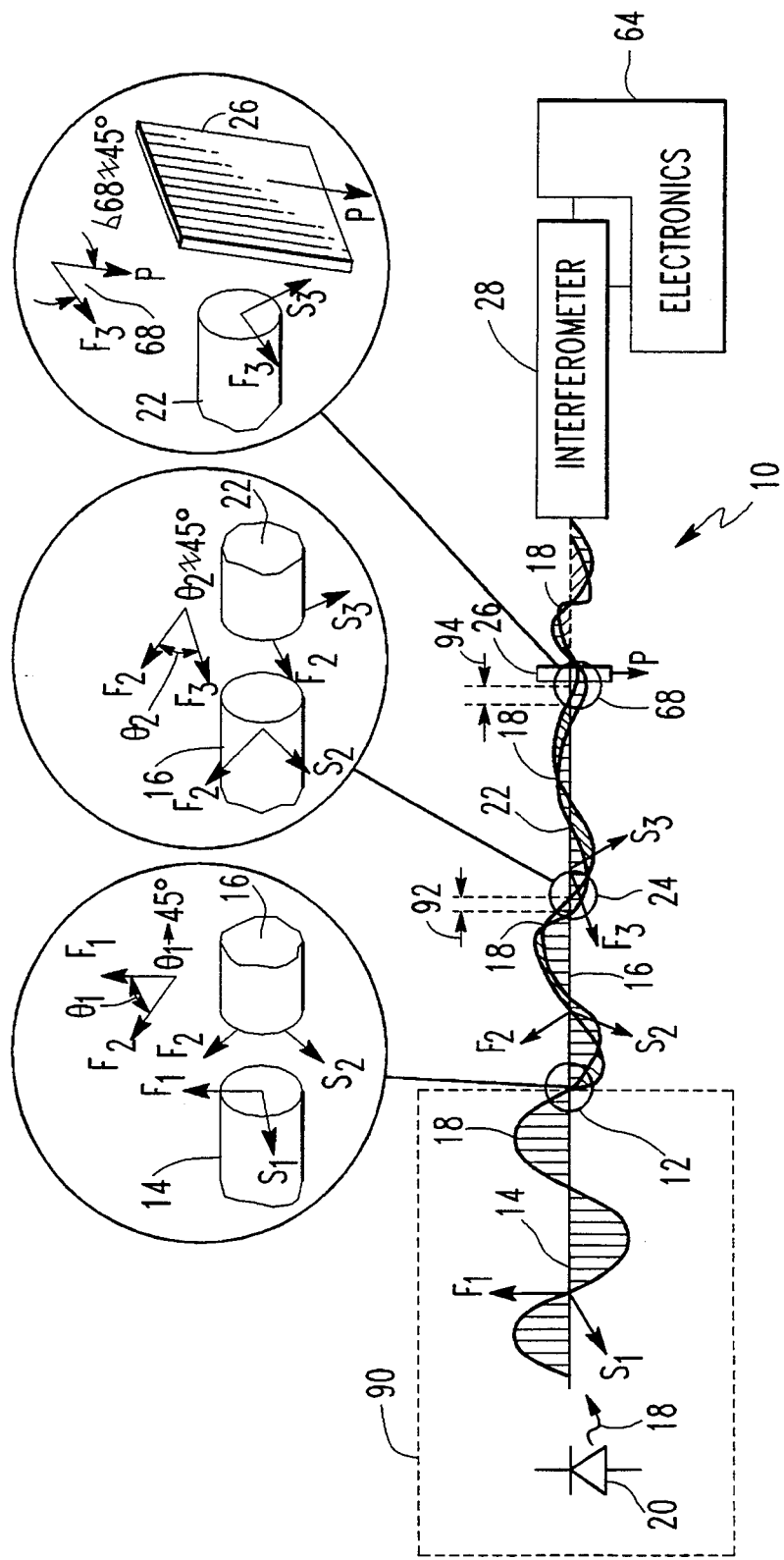

The determination of precise alignment of axes of two birefringent or polarization maintaining fibers may be attained by set-up 10 in FIGS. 1a and 1b. An angle theta$_1$ of 45 degrees is to be achieved at junction 12 of fibers 14 and 16. Polarized broadband light 18 from source 20 is injected into one of the axes (fast axis F$_1$ and slow axis S$_1$) of fiber 14. That is, the polarized input light 18 is aligned to an axis (e.g., fast axis $F_1$) of fiber 14. It is not necessary that the alignment be very accurate or the light be highly polarized, as a reduced extinction ratio only acts to reduce the peak signal level which is proportional to $(P_x - P_y)$, or $(P_{total} - 2P_y)$, for instance, since $(P_x + P_y = P_{total})$. For example, a 20 db extinction ratio at the input results in only a two percent loss of signal. Output light 18 of fiber 14 at junction 12 is polarized. At junction 12 of fibers 14 and 16, an alignment angle theta$_1$ between fast axis $F_1$ of fiber 14 and fast axis $F_2$ of fiber 16, is introduced causing light 18 to be split between the two axes of fiber 16. Portions of light 18 then propagate through both the fast and slow birefringent axes, $F_2$ and $S_2$, respectively of fiber 16 so that the "slow" light relative to the "fast" light, incurs a phase delay 92, delta$_2$, because light 18 travels in the two axes $F_2$ and $S_2$ at different speeds, due to differing indices of refraction of the two axes.

Between fibers 16 and 22, a nonalignment angle theta$_2$ is introduced at junction 24. This nonalignment permits some light 18, at junction 24, from both axes $F_2$ and $S_2$ of fiber 16 to couple to the fast axis $F_3$ of fiber 22, and some light 18 from both axes of fiber 16 to couple to the slow axis $S_3$ of fiber 22. The angle theta$_2$ of nonalignment at junction 24 is not critical to the attaining a certain angle theta$_1$, but the best signal is obtained when that angle theta$_2$ is equal to 45 degrees. Light 18 traveling in the two axes of fiber 22 results in a differential phase delay 94 delta$_3$ between the two light 18 signals traveling in the two axes $F_3$ and $S_3$, respectively.

Upon exiting fiber 22, light 18 goes through polarizer 26. Polarizer 26 has a P axis which is nonaligned at some angle 68, optimally at 45 degrees, to an axis of fiber 22. This polarizer 26 nonalignment 68 with fiber 22, passes light from the two fiber axes of fiber 22 into a single plane of polarization before it enters interferometer 28. Interferometer 28 has mirrors 30 and 32, and beam splitter 34. Electronics 64 include modulator 36, lock-in amplifier 38, photodetector 40, signal generator 72 and nulling indicator 66. The arms of interferometer 28 are represented by lengths 42 and 44. A path length imbalance delta$_L$ is introduced between lengths 42 and 44, that is,

|length 42 − length 44| = delta$_L$, so that the beams traveling lengths 42 and 44 incur a differential phase delay delta$_1$. In order to achieve optimal sensitivity, delta$_1$ = delta$_3$.

To attain this equality, the interferometer path length imbalance, delta$_L$, is equated to the optical path length difference between the two axes of fiber 22. That is, delta$_L$ = $L_{22}$·delta$_{n22}$, where $L_{22}$ is the length of fiber 22, and delta$_{n22}$ is the difference in refractive indices of the fast and slow axes in fiber 22, that is, delta$_{n22}$ = $|n_s - n_f|$.

In this equation, $n_s$ is the refractive index of the slow axis and $n_f$ is the refractive index of the fast axis in fiber 22. Since fiber 22 is not one of the fibers being aligned, the phase delays delta$_1$ and delta$_3$ may be permanently fixed to be equal to each other. Thus, fiber 22, plus interferometer 28 or 46 and electronics 64, constitute the analytic tool for 45-degree alignment of fibers 14 and 16.

The moveable position 62 of mirror 32 by modulator 36, or optical length variation of length 56 by modulator electrodes 60, i.e., which affects delta$_L$, is sine-wave modulated at frequency $f_m$ and amplitude $L_m$. Broadband light is used, and the resulting photodetector 40 signal, $V_{out}$ = 1 + gamma(delta$_3$ − delta$_1$)·cos(delta$_3$ − delta$_1$)·sin(2·theta$_2$)·cos(2·theta$_1$), is composed of harmonics of $f_m$ due to the modulation of delta$_1$ by modulator 36 or 60 at $L_m$sin($W_m$t). The overall dynamic delta$_{Ld}$ difference between lengths 42 and 44, or 54 and 56, is equal to delta$_L$ plus $L_m$sin($W_m$t).

Modulator 36 is three piezoelectric (PZT) stacks connected in parallel to the signal generator of lock-in amplifier 38. Mirror 32 is attached to the PZT stacks and the mirror's movement due to modulation is parallel to length 44. The output of detector 40 goes to lock-in amplifier 38. The output of lock-in amplifier 38 goes to nulling indicator 66, so that the nulling can be observed as a 45 degree alignment at junction 12, or other alignment variation at junction 12 may be measured.

Figure 4:
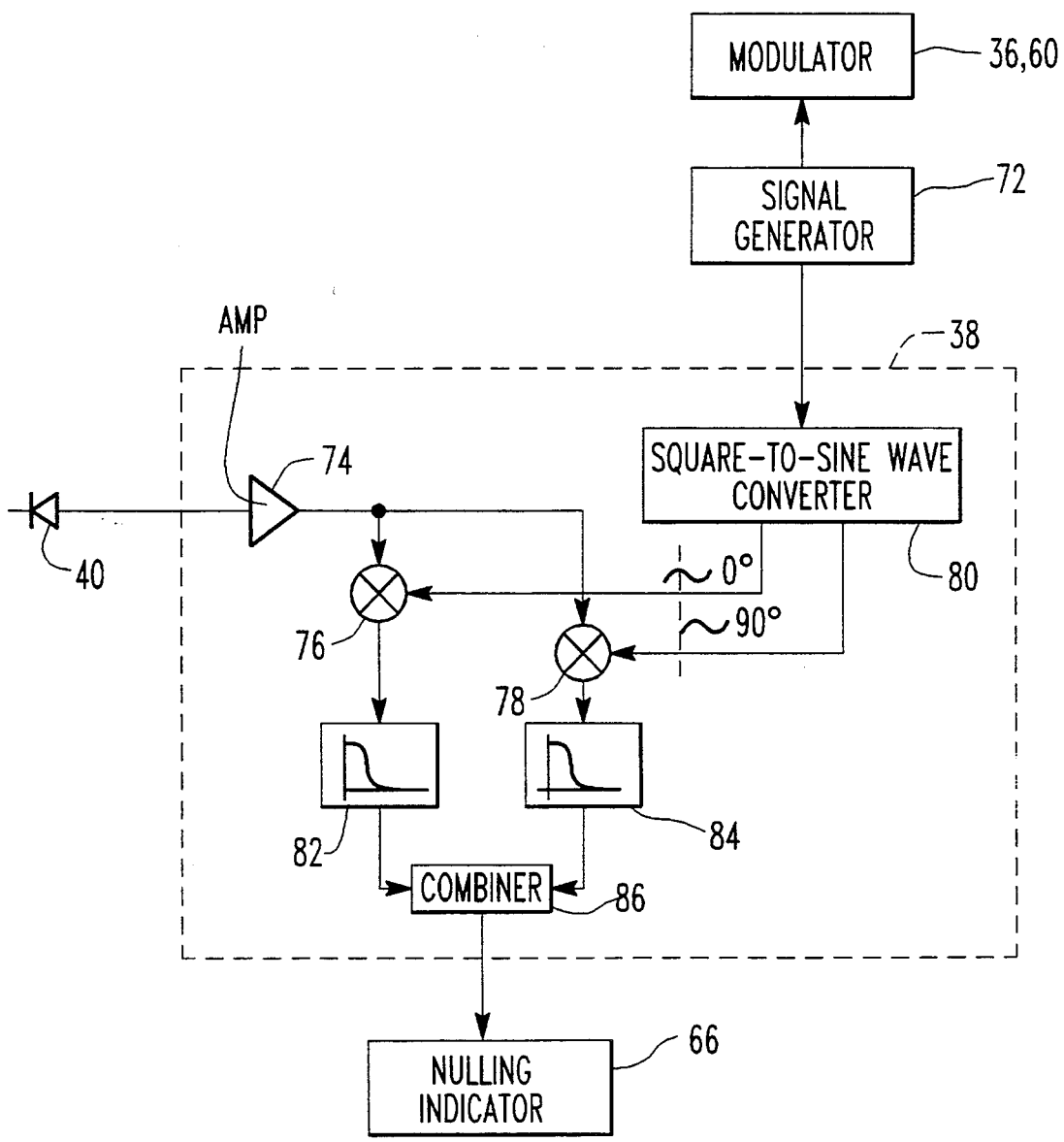
FIG. 4 is a diagram of the electronics.

To retrieve the signal at $f_m$, the photodetector 40 output is processed via the lock-in detection by amplifier 38. Lock-in amplifier 38 is used to detect and process very small AC signals. Accurate detection can be made, even if the sought-after signal is obscured by noise sources much larger in magnitude than the signal. Amplifier 38 incorporates phase-sensitive detection to single out the component of the signal at a specific reference frequency and phase. Noise signals at frequencies other than the reference frequency are rejected. A current signal, having fundamental and higher harmonies, from photodiode 40, goes to a current-to-voltage amplifier 74 of lock-in amplifier 38 in FIG. 4. The voltage signal output of amplifier 74 goes to multipliers 76 and 78. Function or signal generator 72 outputs a sine wave drive signal to modulator 36 or 60. A square wave reference signal of the same frequency $f_m$, is output to a square-to-sine wave converter 80. A first sine wave signal from converter 80 goes to multiplier 76. A second sine wave signal, which has a ninety-degree phase difference from the first sine wave, goes to multiplier 78. The output signal from amplifier 74 is multiplied with the first sine wave signal in multiplier 76 and with the second sine wave signal in multiplier 78, respectively, wherein multiplier 76 outputs a signal to a low-pass filter 82 and multiplier 78 outputs a signal to filter 84. Low-pass filters extract harmonics and noise, and pass the fundamental frequency components of the signals from multipliers 76 and 78. The signal from low-pass filter 82, which may be designated as an "X" signal, and the signal from filter 84, which may be designated as a "Y" signal, are combined in circuit 86. The output "R" of circuit 86 is represented by the expression, $R = (X^2 + Y^2)^{\frac{1}{2}}$, where such output signal R indicates the photodiode 40 signal amplitude, and is independent of the phase relationship between the signal from photodiode 40 and the lock-in reference signal from generator 72. An angle phi is the phase difference between the photodiode 40 signal $V_{sig}$ and the oscillator 72 reference signal;

$X = V_{sig} \cos(phi)$, and $Y = V_{sig} \sin(phi)$.

"X" is the in-phase component and "Y" is the quadrature component. The phase angle phi between the output signal R and the lock-in reference signal from generator 72, may be determined by $phi = \tan^{-1}(Y/X)$.

The lock-in amplifier 38 detected signal $V_{fm}$, which is a function of $theta_1$, at modulation frequency $f_m$, provided that $delta_1$ approximately equals $delta_3$, is:

$V_{fm}(theta_1) = k \cdot \sin(2 \cdot theta_2) \cdot \cos(2 \cdot theta_1)$, since $gamma(delta_3 - delta_1)$ approximately equals $gamma(0)$, and $gamma(0)$ equals one. Since k and $theta_2$ are constant, then $V_{fm}$ is a function of $theta_1$ as indicated by the above-stated equation. The fundamental frequency, despite the presence of higher harmonics, from photodetector 40 is sufficient for angle determination. Gamma is a coherence function dependent upon the difference between $delta_1$ and $delta_3$. As that difference approaches zero, gamma of the difference approaches one. Coefficient k is a system-dependent constant, dependent on the light source and the light handling properties of system 10.

Figure 3:
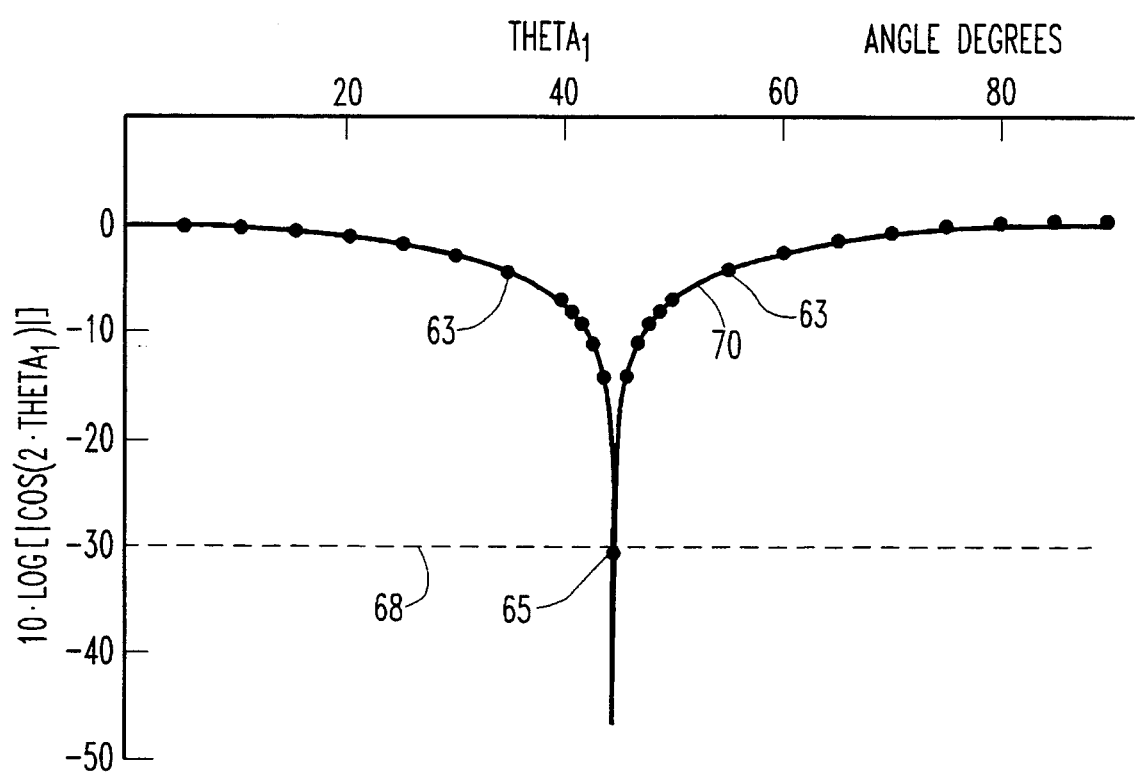
FIG. 3 is a graph showing the experimental fiber-to-fiber forty-five degree alignment accuracy against a theoretical curve.

$Theta_2$ is chosen to be about 45 degrees merely for a maximum indication by signal $V_{fm}$ for determining the $ta_1$ to be 45 degrees, since $\sin(2 \cdot 45 \text{ degrees}) = 1$. For angles other than 45 degrees, such as 0, 30, 70 and 90 degrees, $\sin(2 \cdot theta_2)$ is 0, 0.87, 0.64 and 0, respectively. Thus, deviation of $theta_2$ from 45 degrees at junction 24 merely weakens the indicating qualities of the signal at photodetector 40. As $theta_1$ at junction 12 approaches 45 degrees when combination 90 of light source 20 and fiber 14 are rotated, $V_{fm}$ approaches zero (because if $theta_1$ is 45 degrees, then $\cos(2 \cdot 45 \text{ degrees})$ equals zero); hence, after signal processing by lock-in amplifier 38, nulling of the first harmonic signal represents a successful rotation of fibers 14 and 16 and an achieved 45-degree alignment at junction 12. An example of experimentally-achieved fiber-to-fiber 45-degree alignment curve, which includes data points 63 and 65, versus theoretical alignment curve 70, is shown in the graph of FIG. 3. The abscissa of the graph indicates the rotation angle in degrees, and the ordinate indicates the expected and achieved lock-in output to nulling indicator 66, which is expressed, in normalized relative units, as:

$10 \cdot \log[|\cos(2 \cdot theta_1)|]$.

The output to indicator 66 may also determine other angles of alignment of the axes at junction 12. The horizontal dashed line 68 in the graph represents a nonalignment of 0.03 degrees from 45 degrees, as can be calculated with the above expression. Line 68 represents a level of resolution and accuracy attainable in the alignment example of FIG. 3, as indicated by data point 66. Background light and electrical signal noise are some factors of systems 10 and 50 that limit the resolution of detection.

Figure 2A:
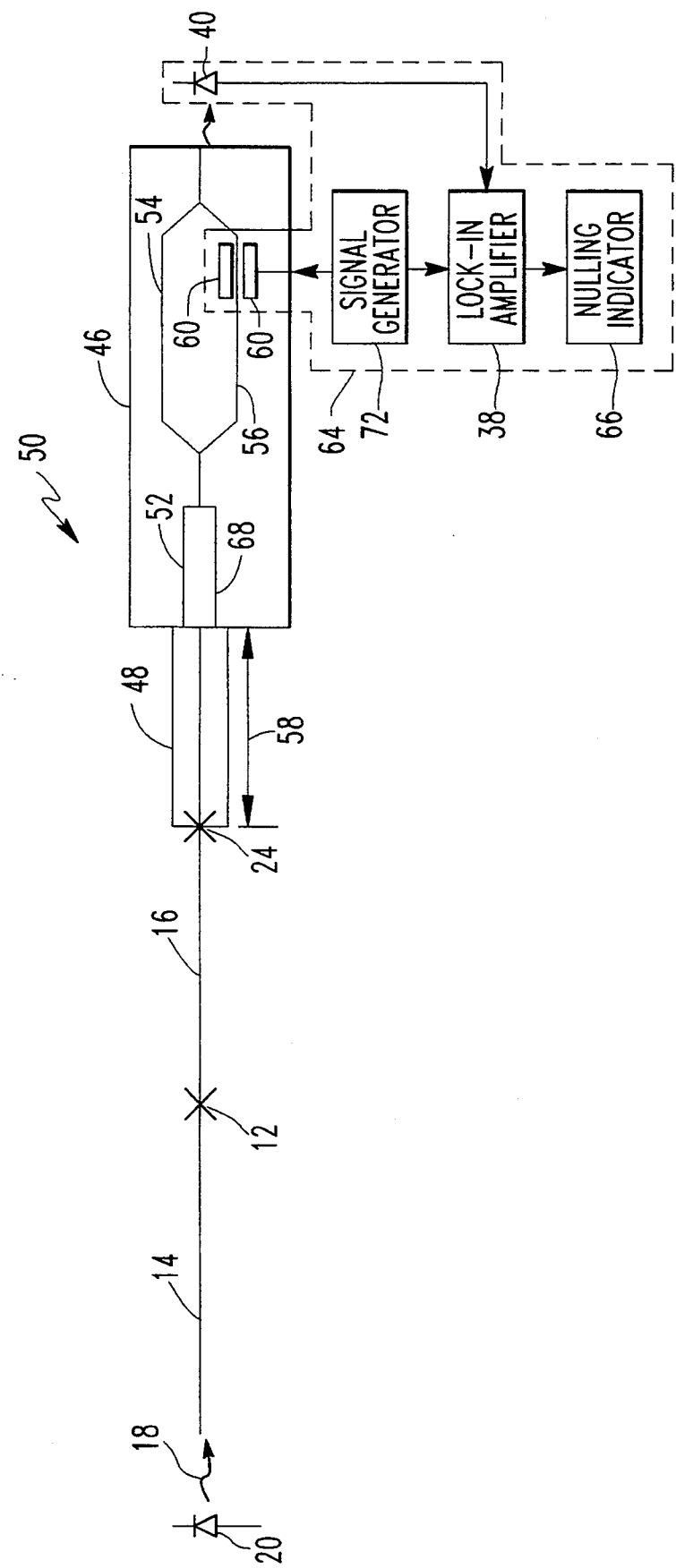
FIGS. 2a and 2b show another arrangement incorporating an integrated optical circuit for alignment determination of the axes for joining fibers.
Figure 2B:
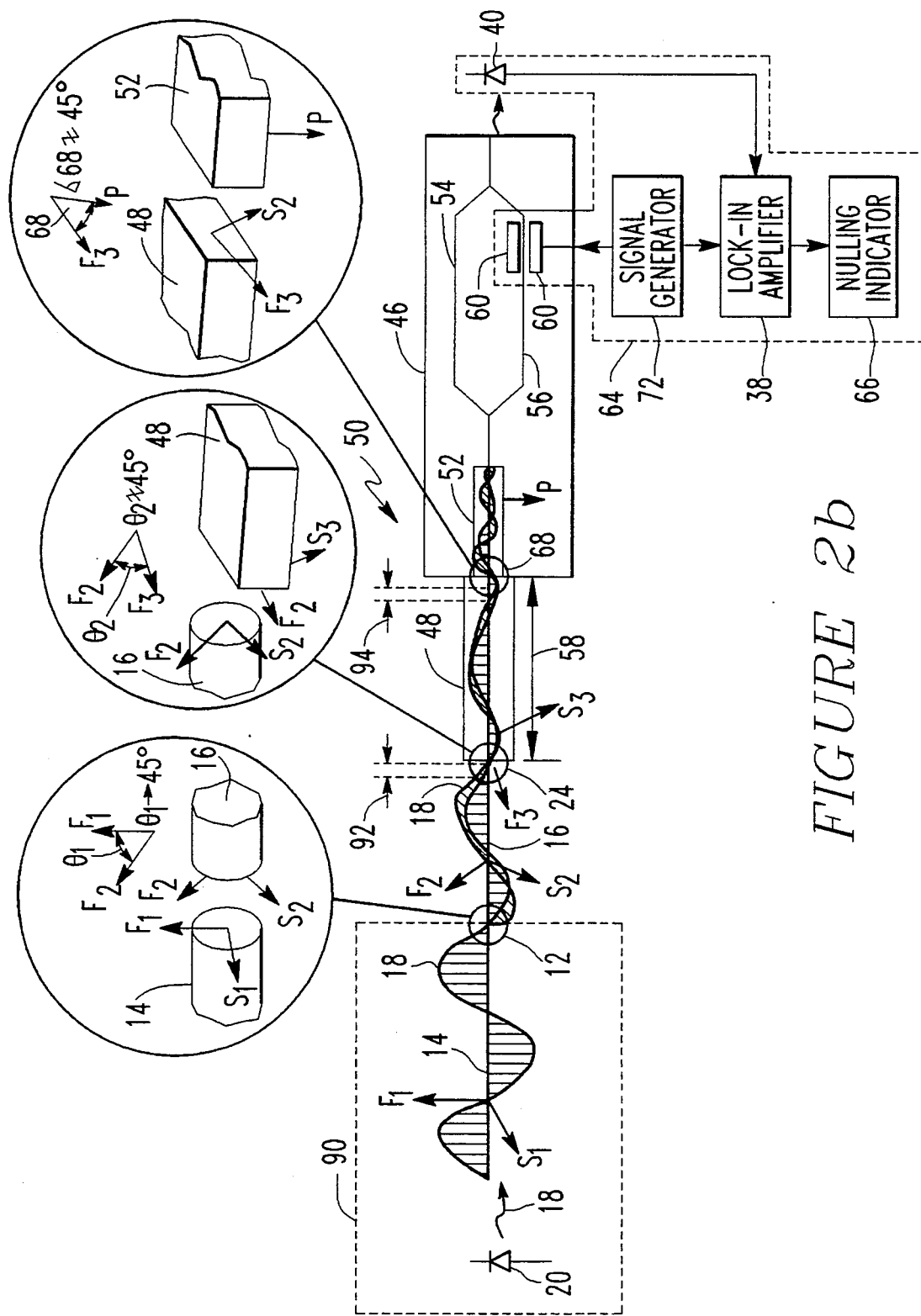

An integrated optics chip version 50 of the invention in FIGS. 2a and 2b may be implemented thereby resulting in minimal hardware size and a low modulation voltage. A Mach-Zehnder interferometer chip 46, having modulator 60, is used in lieu of Michelson interferometer 28 and modulator 36, respectively. Birefringent component 48 and polarizer 52 are used in lieu of fiber or component 22 and polarizer 26, respectively. The set-up is the same for light source 20, light 18, fiber 14, junction 12, fiber 16 and junction 24. Junction 24 has fiber 16 aligned at an angle $theta_2$ of 45 degrees to the integrated optic-waveguide chip 48. Waveguide chip 48 axes are aligned and fixed at about a 45 degree angle 68 with respect to axis P of polarizer 52 of interferometer chip 46. Arms 54 and 56 of the Mach-Zehnder interferometer, have lengths that differ geometrically by $delta_L$. Length 58 of waveguide chip 48 is such that $z(n_o - n_e) = n_e \cdot delta_L$, where z is length 58, $n_o$ is the ordinary (slow axis) index of refraction of lithium niobate and $n_e$ is the extraordinary (fast axis) index of refraction of lithium niobate. The expression $n_e \cdot delta_L$ is used here because it is the optical length that is important. For interferometer 28 in air, $n = 1$, thus n of air, for lengths 42 and 44 in the discussion above, is disregarded. Modulator (or electrodes) 60 receive an electrical signal $f_m$ from signal generator 72, to modulate the light signal in arm or length 56 at the frequency of $f_m$. The principles of operation of system 50 are the same as those described for system 10.

We claim:

1. A nulling detector for indicating a forty-five degree axis alignment between birefringent axes of two optical components, comprising:
    a polarized light source;
    a first optical component having birefringent axes and having first and second ends;
    a polarizer having an input connected to the second end of said first optical component and having an output; and
    an interferometer having an input connected to the output of said polarizer, and having an output; and
    wherein:
        a to be attained forty-five degree axis alignment is between a second optical component, having at least one birefringent axis, and having first and second ends, and a third optical component, having at least one birefringent axis, and having first and second ends;
        the second optical component has a first end connected to the output of said polarized light source such that the major portion of polarized light from said light source is capable of propagating through the at least one birefringent axis from the first end to the second end of the second optical component;
        the third optical component has the first end proximate to the second end of the second optical component and the second end proximate to the first end of said first optical component such that light from the third optical component is capable of entering both first and second axes of said first optical component;
        the at least one axis at the second end of the second optical component and the at least one axis at the first end of the third optical component have an alignment that is indicated by a nulling indicator;
        light from both first and second axes at the second end of said first optical component, is capable of going through said polarizer and into the input of said interferometer;

said interferometer has first and second light paths and the first and second light paths have optical lengths that differ so as to compensate for the phase delay that occurs between light in the first and second axes of said first optical component; and the output of said interferometer is connected to the nulling indicator which is capable of providing an indication of a forty-five degree axis alignment between the birefringent axes at the second end of the second optical component and the first end of the third optical component, upon a null determination by the nulling indicator.

2. The detector of claim 1 further comprising:

a light detector proximate to the output of said interferometer for detecting light from said interferometer;

a modulator connected to said interferometer for modulating the second light path;

a signal generator connected to said modulator; and a lock-in amplifier having inputs connected to said light detector and to said signal generator, respectively; and wherein the nulling indicator is connected to said lock-in amplifier.

3. The detector of claim 2 wherein said lock-in amplifier comprises:

a square-to-sine wave converter connected to said signal generator;

a first multiplier connected to said square-to-sine wave converter and to said light detector;

a second multiplier connected to said square-to-sine wave converter and to said light detector;

a first filter connected to said first multiplier;

a second filter connected to said second multiplier; and a signal combiner connected to said first and second multipliers and to the nulling indicator.

4. A detector for indicating an accurate forty-five degree alignment between the axes of first and second birefringent fibers, comprising:

a polarized light source for providing light through a light path of one axis of the first fiber, and where the light passes from the one axis of the first fiber into the light paths of two axes of the second fiber, the first and second fibers are end-to-end for light passage and the fibers are rotatable relative to each other for achieving a forty-five degree alignment of the axes of the first fiber relative to the axes of the second fiber;

a birefringent component having two axes aligned approximately to the two axes of the second fiber at an end of the second fiber not adjacent to the first fiber, for receiving the light from the second fiber into the two axes of said birefringent component, wherein the light in a path of one axis has a phase delay relative to the light in a path of the other axis upon exiting the birefringent component at an end not adjacent to the second fiber;

a polarizer, situated at the end of said birefringent component not adjacent to the second fiber, having a polarization axis aligned at approximately forty-five degrees relative to the axes of said birefringent component, wherein said polarizer passes and polarizes light received from both axes of said birefringent component; and an interferometer, having a beamsplitter for receiving light from said polarizer and splitting the light for propagation through two optical paths having unequal optical lengths to compensate for the phase delay between the light going through a path of one axis relative to the light going through the other path of said birefringent component, having a beam combiner for combining into an interference the light from the two optical paths of said interferometer, where a null in the interference signal indicates an accurate forty-five degree alignment between the axes of the first and second birefringent fibers.

5. The detector of claim 4 further comprising:

a modulator proximate to one path of the two optical paths of said interferometer, for modulating the optical length of the one path;

a signal generator for providing a modulating signal to said modulator and reference signal;

a light detector proximate to the interference of the light from the two optical paths of said interferometer, for providing an interference electrical signal representative of the interference;

a lock-in amplifier for receiving the reference signal from said signal generator and receiving the interference electrical signal, and improving the interference electrical signal by removing second and higher harmonics and noise from the interference electrical signal; and an indicator for receiving the improved interference electrical signal and for visually indicating the occurrence of a null in the interference electrical signal thereby indicating a very accurate forty-five degree alignment between the axes of the first and second birefringent fibers.

6. The detector of claim 5 wherein the first and second birefringent fibers may be substituted with any birefringent components having axes to be aligned at forty-five degrees.

7. The detector of claim 6 wherein said lock-in amplifier comprises:

a converter for converting the reference signal into a first sine wave and a second sine wave having a ninety-degree phase delay relative to the first sine wave;

a first multiplier for multiplying the interference electrical signal with the first sine wave into an output signal;

a second multiplier for multiplying the interference electrical signal with the second sine wave into an output signal;

a first low-pass filter for filtering the output signal from said first multiplier into a first filtered signal;

a second low-pass filter for filtering the output signal from said second multiplier into a second filtered signal; and a combiner for combining the first and second filtered signals into the improved interference signal.

8. The detector of claim 7 wherein:

the first filtered output signal is $V_{is} \cdot \cos(phi)$;

the second filtered output signal is $V_{is} \cdot \sin(phi)$;

$V_{is}$ is a voltage magnitude of the first and second filtered signals;

phi is an amount of phase shift of a signal relative to the reference signal;

$X = V_{is} \cdot \cos(phi)$;

$Y = V_{is} \cdot \sin(phi)$ $(X^2 + Y^2)^{\frac{1}{2}} = R$; and

R is an amplitude of the improved interference signal and R is independent of a phase relationship between the interference signal and the reference signal.

9. A device for aligning the first and second axes of a first birefringent component at a forty-five degree angle with the first and second axes, respectively, of a second birefringent component, wherein a light path along the first axis has a refractive index that differs in value from a refractive index of a light path along the second axis for each birefringent component, comprising:

a light source for emitting a first light beam having a first polarization, a first birefringent component having a first light path at a first axis and a second light path at a second axis, said first birefringent component having a first end connected to said light source such that the first light beam having the first polarization propagates through the first light path from the first end to a second end of said first birefringent component;

a second birefringent component having a first light path at a first axis and a second light path at a second axis from a first end to a second end of said second birefringent component, said second birefringent component having the first end next to the second end of said first birefringent component, such that the first light beam can enter the first light path and/or the second light path of said second birefringent component, dependent upon an angle of alignment of the first and second axes at the second end of said first birefringent component with the first and second axes, respectively, at the first end of said second birefringent component, said angle of alignment adjustable by rotation of said first birefringent component relative to said second birefringent component, wherein light propagating through the first light path of said second birefringent component is a second light beam and light propagating through the second light path of said second birefringent component is a third light beam;

a third birefringent component having a first light path at a first axis and a second light path at a second axis from a first end to a second end of said third birefringent component, said third birefringent component having the first end next to the second end of said second birefringent component, such that light from the second beam propagates into both first and second light paths of said third birefringent component and light from the third beam propagates into both first and second light paths of said third birefringent component, wherein light propagating through the first light path of said third birefringent component is a fourth light beam and light propagating through the second light path of said third birefringent component is a fifth light beam;

a polarizer having a light path at an axis from a first end to a second end of said polarizer, said polarizer having the first end next to the second end of said third birefringent component, such that at least portions of light from both fourth and fifth beams propagate through said polarizer; and an interferometer having a nulling indicator, and having an input next to the second end of said polarizer such that the portions of light from both fourth and fifth light beams from said polarizer enter said interferometer, and the fourth and fifth light beams are compared with each other that result in an effective comparison of magnitudes of the second and third light beams in said second birefringent component, wherein the nulling indicator provides a signal that approaches a null as the magnitudes of the second and third light beams become equal to each other, and the magnitudes of the second and third light beams become equal to each other as the angle of alignment of the first and second axes at the second end of said first birefringent component with the first and second axes, respectively, at the first and of said second birefringent component, approaches forty-five degrees.

10. The device of claim 9 wherein said third birefringent component, said polarizer, and said interferometer are at least partially implemented in integrated optical circuit technology.

11. A device for aligning the first and second axes of a first birefringent optical fiber at a forty-five degree angle with the first and second axes, respectively, of a second birefringent optical fiber, wherein a light path along the first axis has a refractive index that differs in value from a refractive index of a light path along the second axis for each birefringent optical fiber, comprising:

a light source for emitting a first light beam having a first polarization, a first birefringent optical fiber having a first light path at a first axis and a second light path at a second axis, said first birefringent optical fiber having a first end connected to said light source such that the first light beam having the first polarization propagates through the first light path from the first end to a second end of said first birefringent optical fiber;

a second birefringent optical fiber having a first light path at a first axis and a second light path at a second axis from a first end to a second end of said second birefringent optical fiber, said second birefringent optical fiber having the first end next to the second end of said first birefringent optical fiber, such that the first light beam can enter the first light path and/or the second light path of said second birefringent optical fiber, dependent upon an angle of alignment of the first and second axes at the second end of said first birefringent optical fiber with the first and second axes, respectively, at the first end of said second birefringent optical fiber, said angle of alignment adjustable by rotation of said first birefringent optical fiber relative to said second birefringent optical fiber, wherein light propagating through the first light path of said second birefringent optical fiber is a second light beam and light propagating through the second light path of said second birefringent optical fiber is a third light beam;

a third birefringent optical fiber having a first light path at a first axis and a second light path at a second axis from a first end to a second end of said third birefringent optical fiber, said third birefringent optical fiber having the first end next to the second end of said second birefringent optical fiber, such that light from the second beam propagates into both first and second light paths of said third birefringent optical fiber and light from the third beam propagates into both first and second light paths of said third birefringent optical fiber, wherein light propagating through the first light path of said third birefringent optical fiber is a fourth light beam and light propagating through the second light path of said third birefringent optical fiber is a fifth light beam;

a polarizer having a light path at an axis from a first end to a second end of said polarizer, said polarizer having the first end next to the second end of said third birefringent optical fiber, such that at least portions of light from both fourth and fifth beams propagate through said polarizer; and an interferometer having a nulling indicator, and having an input next to the second end of said polarizer such that the portions of light from both fourth and fifth light beams from said polarizer enter said interferometer, and the fourth and fifth light beams are compared with each other that result in an effective comparison of magnitudes of the second and third light beams in said second birefringent optical fiber, wherein the nulling indicator provides a signal that approaches a null as the magnitudes of the second and third light beams become equal to each other, and the magnitudes of the second and third light beams become equal to each other as the angle of alignment of the first and second axes at the second end of said first birefringent optical fiber with the first and second axes, respectively, at the first end of said second birefringent optical fiber, approaches forty-five degrees.

* * * * *